United States Patent [19]

Grau et al.

[11] Patent Number: 5,391,853
[45] Date of Patent: Feb. 21, 1995

[54] PROCESS FOR THE ROLLER SEAM WELDING OF TANKS AND ROLLER SEAM RESISTANCE-WELDING MACHINE FOR CARRYING OUT THE PROCESS

[75] Inventors: Walter Grau, Dietikon; Tomislav Matievic, Schwerzenbach; Manfred Schlemmer, Dietikon, all of Switzerland

[73] Assignee: Elpatronic AG, Zug, Switzerland

[21] Appl. No.: 209,745

[22] Filed: Mar. 10, 1994

[30] Foreign Application Priority Data

Apr. 8, 1993 [CH] Switzerland ............... 01092/93
Feb. 1, 1994 [CH] Switzerland ............... 00290/94

[51] Int. Cl.6 ............................................. B23K 11/06
[52] U.S. Cl. .................................... 219/83; 219/81
[58] Field of Search ................. 219/81, 82, 83, 84, 219/117.1

[56] References Cited

U.S. PATENT DOCUMENTS

| | | | |
|---|---|---|---|
| 3,777,107 | 12/1973 | Jean et al. | |
| 4,652,718 | 3/1987 | Fujita et al. | 219/82 |
| 4,652,719 | 3/1987 | Fujita et al. | 219/82 |
| 4,785,153 | 11/1988 | Stimmel | 219/82 |
| 5,010,226 | 4/1991 | Sato et al. | 219/81 |

FOREIGN PATENT DOCUMENTS

| | | | |
|---|---|---|---|
| 2140716 | 1/1973 | France. | |
| 914763 | 7/1954 | Germany. | |
| 3603919 | 12/1988 | Germany | B23K 11/06 |
| 58-112662 | 7/1983 | Japan | 219/81 |
| 4-470 | 1/1992 | Japan | B23K 11/06 |

Primary Examiner—Clifford C. Shaw

[57] ABSTRACT

A roller seam welding machine is provided with a contour-controlled table for the tank to be welded. The table is driven by a pinion (4) and a pantograph (16), in a known manner. To enable flanges (6) with a three-dimensional profile to be welded, the welding rollers (10,11) are mounted on a vertically traversable head (14) of the machine. This allows the welding rollers to be traversed to suit rises or falls in the welding flange (6). Because the tank itself is manipulated only in a horizontal plane in the conventional manner, with vertical manipulation of the welding rollers as an additional feature, the possibility is afforded in a simple manner of welding tank flanges with three-dimensional profiles with high precision irrespective of the weight and size of the tank.

8 Claims, 1 Drawing Sheet

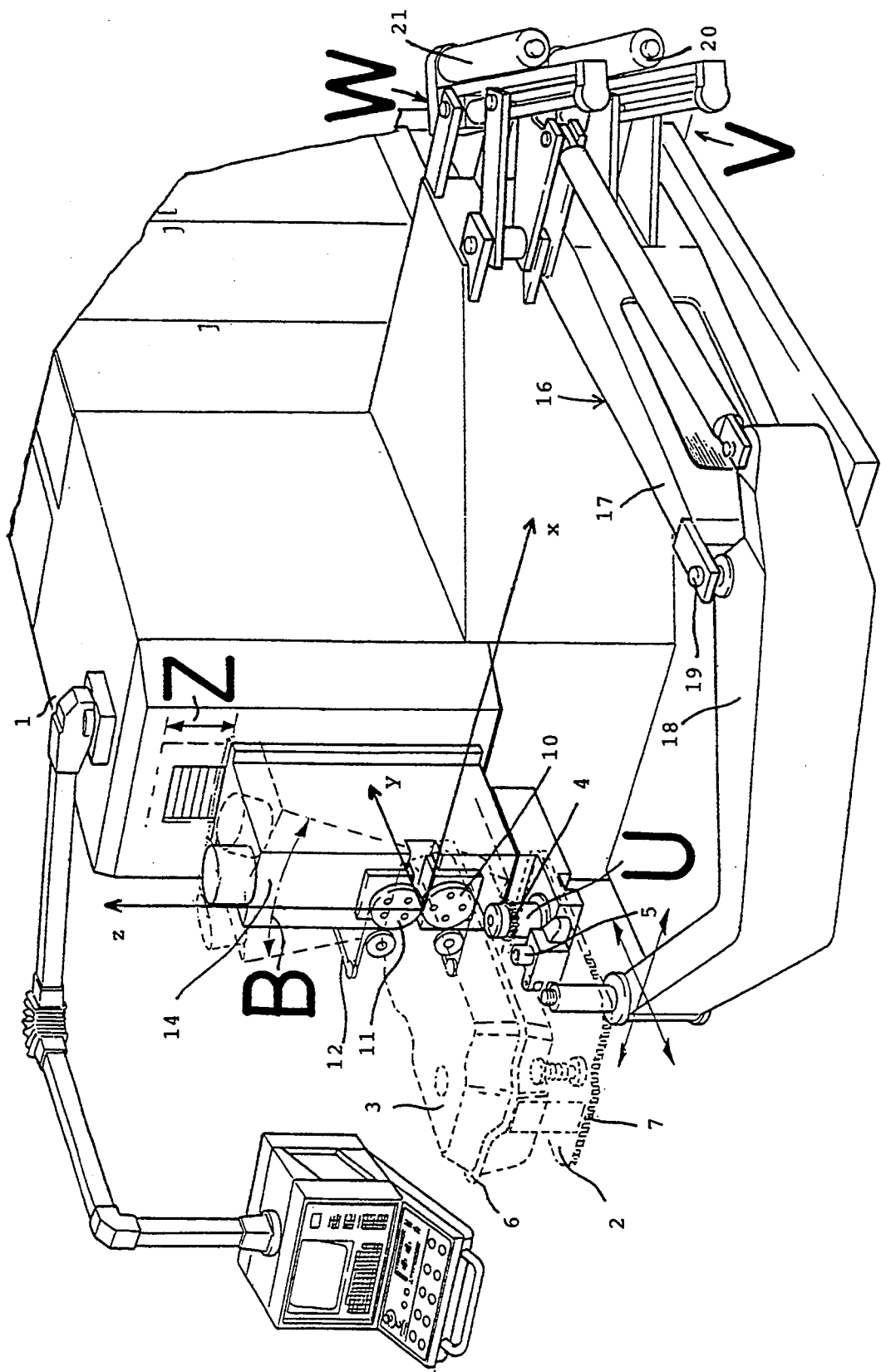

PROCESS FOR THE ROLLER SEAM WELDING OF TANKS AND ROLLER SEAM RESISTANCE-WELDING MACHINE FOR CARRYING OUT THE PROCESS

BACKGROUND OF THE INVENTION

The invention relates to a roller seam welding process and a roller seam resistance-welding machine for carrying out the process.

The use of roller seam welding machines, in particular for welding motor vehicle fuel tanks, is known. Two welding rollers, an upper and a lower, each fed with a wire electrode, follow the contour of the superimposed welding flanges of the tank halves, these flanges having been tacked together prior to welding. In particular, to weld tanks whose welding flanges lie in one plane, it is a known practice to provide a workpiece table to hold the tacked container, this table being provided with a contour, e.g. an outer contour, matching the tank-contour to be welded. The workpiece table is then moved along its contour, causing the welding flange of the tank secured to the table to move between the welding rollers, which are mounted in a fixed position on the machine. This way of moving the tank, with the table driven, in a known manner, by gear teeth on the table's outer contour with which a drive pinion engages, and with a driven arm (called a pantograph) engaging with the table to maintain the tangentiality of the contour to the welding direction, has provided an effective technique for welding tanks with a level welding flange.

The vehicle manufacturers are requiring increasingly complex tank shapes whose fabrication involves non-level tank parting faces, i.e. non-level welding flanges. To weld such tank shapes, technical development has hitherto concentrated on manipulating the tank accordingly, the welding flange still being guided past welding rollers mounted in a fixed position. In particular, to manipulate the tank, a workpiece table has been proposed which enables the tank to be tilted about a tilting axis (Japanese Utility Model 4-470). In addition, manipulation of the tank by means of an industrial robot has been proposed (DE-A 3603919). It has been found that with this method of welding the precise track of the welding path, specified with very close tolerances, often cannot be maintained. The three-dimensional movement of the tank is difficult to manage, particularly in the case of large and heavy tanks. The welding rate—which for efficient tank production should be as high as possible—may be impaired.

It is therefore an object of the invention to provide a process for the roller seam welding of tanks with complex shapes in which the welding flange does not lie in one plane. This should enable a precisely aligned welding path and a high welding rate to be achieved in the simplest possible manner.

It is also an object of the invention to provide a roller seam resistance-welding machine with which the process can be carried out. This machine should allow the welding path to be tracked in a way which is as simple as possible and yet extremely precise, should permit a high welding rate to be maintained, and should allow flanges which follow a three-dimensional profile to be welded at a high welding rate, even on large and heavy tanks.

SUMMARY OF THE INVENTION

The present invention relates to a process and apparatus for roller seam welding a container, in particular a motor vehicle fuel tank, in which the welding flange does not lie in one plane, and the motions executed by the tank during welding are entirely in one movement plane. A contour-guided table is provided to hold the tank and an arm driven in at least two axes moves the table. When welding the non-level or out-of-plane sections of the welding flange, the axes of the welding rollers are shifted as a unit with respect to the movement plane of the tank so that the welding rollers follow the profile of the welding flange.

It has been found that by disassociating the tank manipulations in accordance with the invention, assigning motion within the plane to the tank holder and assigning the third dimension to motion of the welding rollers, a weld alignment and weld seam of excellent quality can be obtained even in a welded flange with a complicated three-dimensional profile. Moreover the manipulation of the tank is straightforward, as it takes place entirely within the plane; and this is true even for large and heavy tanks. The motion of the welding rollers, however, can be controlled with precision, as all parameters are known and are independent of the size or weight of the tank.

BRIEF DESCRIPTION OF THE DRAWINGS

Embodiments of the invention will now be explained, as examples, with reference to the single drawing showing a schematic perspective view of a machine according to the invention.

DESCRIPTION OF THE PREFERRED EMBODIMENTS

The roller seam resistance-welding machine 1 shown in the drawing has a workpiece table 2. The workpiece table 2 is provided with gear teeth 7 on its outer contour. The outer contour of the workpiece table corresponds to the projection of the required weld path on the welding flange 6 of the vehicle tank 3 to be welded, which is mounted on the workpiece table. The table 2 is displaced by a drive pinion 4 which meshes with the gear teeth 7. A counter-roller 5 keeps the pinion positively meshed when the workpiece table 2 is in motion. The axis of the pinion 4 establishes a first axis U of the motion of the tank.

The workpiece table is also connected to an arm 16, which will be referred to as the pantograph. The pantograph is provided with a first drive 20, e.g. a screw spindle drive. By means of this drive 20 the pantograph together with the workpiece table 2 is moved in such a way that the tangentiality of the contour to the welding direction is preserved. The driven pantograph establishes a second axis V. The possible motions of the workpiece table which have so far been described, with the axes U and V, give the tank the facility of movement within a plane. The flange 6 of the tank 3 is positioned for welding between the welding rollers 10 and 11, each of which is fed with a wire electrode 12. Each of the welding rollers turns about its central axis and the tank 3 is made to move in the manner which has been described, so that the welding rollers 10 and 11 run along the predetermined welding path on the welding flange 6.

On the machine 1 shown in the drawing, the welding rollers are mounted on a head 14 which can be vertically traversed up or down. This makes it possible for the pair of welding rollers to follow a non-level, i.e. rising or falling, flange profile. For this purpose the head 14 can be traversed vertically, along the Z axis, by means of a drive mechanism. The drive in the Z axis is controlled by a numerical machine control, as will be explained presently.

In the example shown in the drawing, the machine is provided with a further axis B about which the head 14 can be tilted. This tilting action enables the weld point at the welding rollers to be kept at the same place when the head 14 is traversed in the Z direction as when welding the level part of the welding flange 6. The said motion of the tank 3 in the plane combined with the vertical traversing facility, and, preferably, the tilting facility B, of the head allow three-dimensional flange profiles to be welded without any problems. The maneuverability of the head 14 with the welding rollers makes it possible to follow the exact contour of the welding flange as it rises or falls. This yields the advantages which have already been described.

The pantograph 16 is divided into two sections 17 and 18. The section 18 is pivotably attached to the section 17 by means of a hinge 19 and is provided with an independent drive 21. This driven pantograph section establishes a further axis, the W axis, of the machine. This additional drive ensures that tangentiality is maintained in those situations in which indeterminacy occurs. This is the case when the pantograph is in an extended position. The drive 21 may also take the form of a screw spindle drive. Hitherto, it has not been a known practice to drive the W axis of the pantograph when the table 2 is already being moved in a controlled manner by means of the U axis. However, such a combined drive has been found very advantageous for the realization of optimum tracking accuracy of the welding. For the welding of tanks, tracking accuracy (and also accuracy of speed) is very important, because there is an increasing need for highly complex tank shapes to be welded, and because the welding flange is relatively narrow. Since transverse forces occur during welding, maintaining tracking accuracy is not easy, but is achieved by the U, V, W drives which have been illustrated. The result is a closed kinematic chain. Preferably—as shown in the drawing—the drive for the W axis is also arranged to the rear of the pantograph and fixed to the machine, and acts on the front section 18 of the pantograph through a parallelogram linkage. This affords a precise drive with low inertia.

Control of the machine is by means of a numerical control unit. Control of the motion of the table 2 is known from existing machines operating only within a plane. In addition the control unit now has to assume control of the head 14. The head 14 has to be traversed, and if need be tilted, so that the welded rollers are shifted to suit the required rise or fall of the welding flange 6. Tilting of the head 14 occurs as a function of the required gradient of the rise or fall of the flange 6, so as to keep the weld zone between the rollers at the same point, independently of the vertical motion of the head 14. These additional control functions can routinely be performed by a conventional numerical control of the kind already in use on similar welding machines.

We claim:

1. Process for the roller seam welding of a container in which the welding flange of the container does not lie in one plane, the process comprising the steps of:
    providing a contour-guided table to hold the container;
    providing an arm driven in at least two axes for moving the table and a held container in a movement plane;
    moving the table and container in the movement plane by means of the driven arm;
    welding the welding flange of the container during the step of moving by means of a pair of welding rollers, each of the welding rollers having an axis of rotation; and
    moving the axes of the welding rollers as a unit in a direction perpendicular to the movement plane during welding so that the welding rollers follow the welding flange.

2. Process according to claim 1, further comprising the step of:
    rotating the welding rollers as a unit about a tilting axis extending parallel to the movement plane, and wherein the steps of moving the axes of the welding rollers and rotating the welding rollers are performed by a head, the rollers being mounted to the head, the head being moveable in the direction perpendicular to the movement plane and rotatable about the axis parallel to the movement plane.

3. Process according to claim 1, wherein the step of moving the table is performed by driving the arm using a parallelogram linkage.

4. Roller seam resistance-welding machine for welding a container which has a welding flange not lying in a single plane, the machine comprising:
    a workpiece table having a contour and being positively driven along the contour for rotational motion of the table in a single plane,
    a two-part driven arm mounted away from the workpiece table for moving the workpiece table in directions parallel to said plane; and
    welding rollers moveable as a unit in a direction perpendicular to said plane during a welding operation to follow the welding flange.

5. Roller seam resistance-welding machine according to claim 4, wherein the rollers are also rotatable as a unit about an axis parallel to said plane during the welding operation.

6. Roller seam resistance-welding machine according to claim 5, wherein the rollers are mounted on a carriage, the carriage being moveable in the direction perpendicular to said plane and rotatable about the axis parallel to the plane.

7. Roller seam resistance-welding machine according to claim 4, wherein the arm comprises one part being coupled to the table and extending from the table to a hinge, and a drive mechanism for driving the one part of the arm, the drive mechanism comprising a motor coupled to the one part of the arm by a parallelogram linkage.

8. Roller seam resistance-welding machine according to claim 7, wherein the motor for the one part of the arm is fixed to an end of the one part of the arm opposite to an end coupled to the table.

* * * * *